W. H. BEAN.
ELECTRIC TROLLEY WHEEL.
APPLICATION FILED DEC. 22, 1910.
997,262. Patented July 11, 1911.
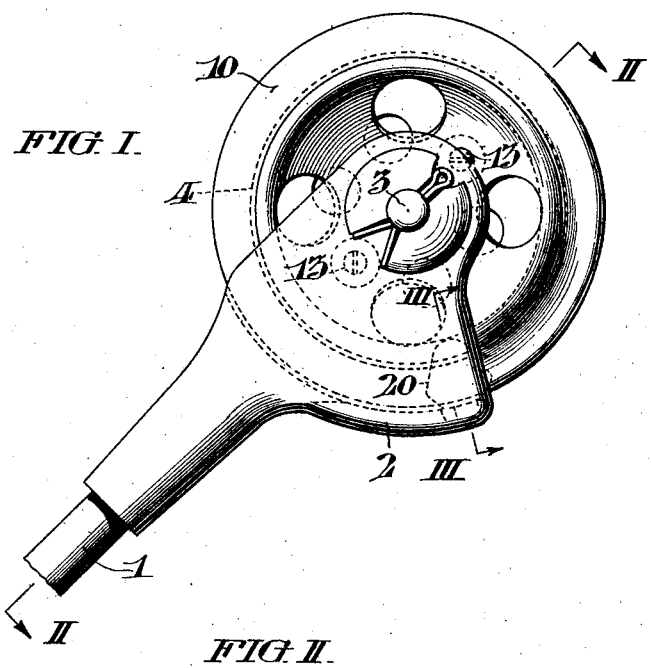
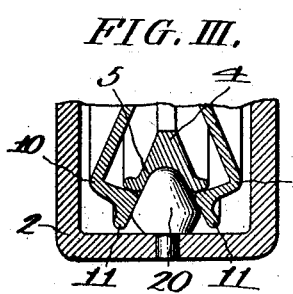
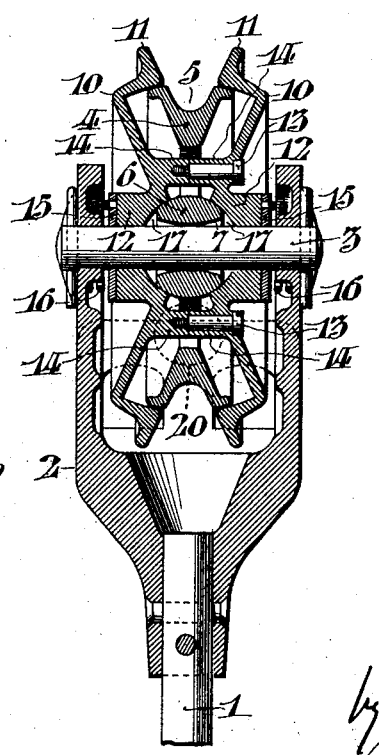
Inventor
William H. Bean,
Attorneys United States Patent Office.

WILLIAM H. BEAN, OF FERNDALE, PENNSYLVANIA.

ELECTRIC-TROLLEY WHEEL.

997,262.  Specification of Letters Patent. Patented July 11, 1911.

Application filed December 22, 1910. Serial No. 598,721.

*To all whom it may concern:*

Be it known that I, WILLIAM H. BEAN, of Ferndale, in the county of Bucks and State of Pennsylvania, have invented certain new and useful Improvements in Electric-Trolley Wheels, whereof the following is a specification, reference being had to the accompanying drawings.

My invention relates to a compound trolley wheel comprising a central grooved body portion, and two side or flange portions. The two side portions are united in fixed relation to each other, and run true, while the body portion is so mounted as to be capable of an independent limited rocking motion upon the axle on which the wheel runs.

In the accompanying drawings, Figure I, is an elevation of a trolley harp carrying a trolley wheel embodying my invention. Fig. II, is a longitudinal section of the same. Fig. III, is a detail view of the coned finger 20.

The trolley pole 1, carries the harp 2, between the sides of which is carried the axle 3. The body portion 4, of the trolley wheel has a grooved periphery 5, and a hub 6, the axle aperture 7, of which flares in both directions from the center so as to permit said body portion to rock to a limited extent upon the axle 3.

The body portion 5, is received between two side portions 10, 10. These side portions comprise the flanges 11, and the hub portions 12, which run true upon the axle 3. The two side portions are united along the median plane of the trolley, by screws 13, connecting paired projections 14, their contact being permitted by corresponding apertures in the body portion 4, of the wheel. This compels coincident rotation of all the portions.

Electrical contact between the trolley pole and the side portions of the wheel is maintained by the contact plates 15, 15, pressed against the ends of the hubs of the two side portions by means of coiled springs 16, through which the electrical circuit is maintained.

Electrical contact between the side portions of the wheel and the body portion is maintained by correspondence between the outer surface of the hub of the body portion and the inner surfaces of the recesses 17, in the hubs of the flange portions within which the hub of the body portion is received.

As thus described, the flanges of the trolley wheel run true, but the body portion containing the seat of the groove is capable of a limited rocking motion. In order to the better maintain a trolley wire seated in the groove of the trolley, it is desirable that any rocking of the groove shall be limited to partial rotation upon a more or less vertical axis, and in order to accomplish this, I provide a coned finger 20, mounted in fixed relation to the harp so as to occupy the groove of the trolley wheel on its lower side. The contact of this finger with the groove of the trolley wheel prevents any rocking of the wheel upon its axle, except such rocking as may occur along an axial line passing through the finger, and also through the center of the hub of the trolley wheel. This axial line when prolonged through the hub passes to or near the point where the trolley wheel contacts with its wire, which point of contact, therefore, is truly maintained, notwithstanding partial rocking of the wheel along the axial line which has been pointed out.

An advantage resulting from the construction which I have described is that the groove of the trolley wheel can the better conform to and maintain contact with a trolley wire even though (as when running on a curve), the wire is not in perfect alinement with the path in which the trolley wheel must travel. The rocking motion of the body portion of the wheel permits it to accommodate itself to these deflections of the trolley wire. The width of the space between the flanges of the side portions of the wheel is sufficiently great to allow a deflected wire to lie between them.

It is important to maintain the fixed relation of the flanges of the wheel when the trolley wheel is passing the various switches, frogs and breakers, where the proper maintenance of the trolley wheel in its path is dependent upon the fixed relation of the flanges of the wheel to their bearing. Another advantage of my invention relates to the ready replaceability of the body portion, which constitutes the wearing section of the wheel, and which may be cheaply made and replaced. Experience shows that almost all of the wear upon the trolley wheel is in the vicinity of the bottom of the groove, so that this wear in my invention is carried by the replaceable body portion.

It will be understood that it is characteristic of my invention that it subdivides the trolley wheel into an intermediate body portion embraced between two side portions, and it permits this body portion to have a rocking motion in relation to its axle while the side portions with their flanges are maintained in true rotary relation thereto.

Having thus described my invention, I claim:—

1. In a trolley wheel, the combination of an intermediate body portion having a grooved periphery; two flanged side portions receiving the body portion between them and united in fixed relation to each other; an axle upon which all three portions of the trolley wheel run; the bearings of the side portions requiring them to run true upon the axle; and the bearing of the body portion permitting it to have a limited rocking motion on the axle.

2. In a trolley wheel the combination of an intermediate body portion having a grooved periphery; two flanged side portions receiving the body portion between them and united in fixed relation to each other; an axle upon which all three portions of the trolley wheel run; the bearings of the side portions requiring them to run true upon the axle; and the bearing of the body portion permitting it to have a limited rocking motion on the axle; and means whereby the rocking motion is limited to motion upon an axial line which passes through the center of its hub, and also through or near the point where the trolley wheel contacts with its wire.

In testimony whereof, I have hereunto signed my name at Ferndale, Pa., this 19th day of December, 1910.

WILLIAM H. BEAN.

Witnesses:
  HIRAM MILLS,
  ANDREW LIGHTCAP.

---

Copies of this patent may be obtained for five cents each, by addressing the "Commissioner of Patents, Washington, D. C."